(12) United States Patent
Matsuno et al.

(10) Patent No.: US 9,184,670 B2
(45) Date of Patent: Nov. 10, 2015

(54) POWER CONVERSION DEVICE

(71) Applicant: DENSO CORPORATION, Kariya, Aichi-pref. (JP)

(72) Inventors: Mitsuharu Matsuno, Aichi-ken (JP); Hiroshi Inamura, Nagoya (JP); Akira Nakasaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 207 days.

(21) Appl. No.: 14/057,494

(22) Filed: Oct. 18, 2013

(65) Prior Publication Data

US 2014/0118909 A1    May 1, 2014

(30) Foreign Application Priority Data

Oct. 29, 2012  (JP) .................. 2012-237936

(51) Int. Cl.
*H05K 5/00* (2006.01)
*H05K 7/00* (2006.01)
*H02M 7/00* (2006.01)

(52) U.S. Cl.
CPC ..................... *H02M 7/003* (2013.01)

(58) Field of Classification Search
CPC .......... H02M 7/003; H02M 7/04; H02M 7/48
USPC ............ 361/600–678, 679.01, 688, 781, 820
See application file for complete search history.

(56) References Cited

U.S. PATENT DOCUMENTS

2008/0316710 A1* 12/2008 Seto et al. ...................... 361/704
2013/0058068 A1*  3/2013 Funatsu ......................... 361/820
2013/0070502 A1*  3/2013 Suzuki et al. ................. 363/131
2013/0272046 A1* 10/2013 Matsuoka et al. ............ 363/132
2014/0185266 A1*  7/2014 Iwata et al. .................... 361/820

FOREIGN PATENT DOCUMENTS

| JP | 2004-312925 |   | 11/2004 |   |          |
|----|-------------|---|---------|---|----------|
| JP | 2004-312925 | A * | 11/2004 | .............. | H02M 7/04 |
| JP | 2006-094586 |   | 4/2006  |   |          |
| JP | 2006-094586 | A * | 4/2006  | .............. | H02M 3/00 |
| JP | 2007-209141 |   | 8/2007  |   |          |
| JP | 2007-209141 | A * | 8/2007  | .............. | H02M 7/48 |
| JP | 2009-005462 |   | 1/2009  |   |          |
| JP | 2011-114966 |   | 6/2011  |   |          |

(Continued)

OTHER PUBLICATIONS

Office Action (3 pgs.) dated Sep. 16, 2014 issued in corresponding Japanese Application No. 2012-237936 with an at least partial English-language translation thereof (3 pgs.).

*Primary Examiner* — Anthony Haughton
*Assistant Examiner* — Yahya Ahmad
(74) *Attorney, Agent, or Firm* — Nixon & Vanderhye PC

(57) ABSTRACT

A power conversion device comprises a main circuit section that has a semiconductor module with a switching element therein and including a main electrode terminal, a capacitor with a capacitor element therein and that includes a capacitor terminal, and a bus bar that connects the main electrode terminal and the capacitor terminal. The capacitor terminal extends from a capacitor main body including the capacitor element therein towards the main circuit section. The bus bar provides a bending section on a base end side of a connecting section between the bus bar and the capacitor terminal. The bus bar and the capacitor terminal are connected such as to overlap in a state in which respective tip directions match.

16 Claims, 15 Drawing Sheets

(56) References Cited

FOREIGN PATENT DOCUMENTS

| JP | 2011-114966 A | * | 6/2011 | ............. | H02M 7/48 |
| JP | 2011-120358 | | 6/2011 | | |
| JP | 2011-120358 A | * | 6/2011 | ............. | H02M 7/48 |
| JP | 2013-055840 | | 3/2013 | | |
| JP | 2013-135538 | | 7/2013 | | |
| JP | 2013-135538 A | * | 7/2013 | ............. | H02M 7/48 |
| WO | WO 2012/164365 | | 12/2012 | | |

* cited by examiner

POWER CONVERSION DEVICE

CROSS-REFERENCE TO RELATED APPLICATION

This application is based on and claims the benefit of priority from earlier Japanese Patent Application No. 2012-237936 filed Oct. 29, 2012, the description of which is incorporated herein by reference.

BACKGROUND OF THE INVENTION

1. Field of the Invention

The present invention relates to a power conversion device, such as an inverter or a converter, mounted in, for example, an electric car or a hybrid car. In particular, the present invention relates to a power conversion device having: a main circuit section having a semiconductor module including a main electrode terminal; a capacitor including a terminal; and a bus bar connecting the main electrode terminal and the capacitor terminal.

2. Description of the Related Art

For example, in some power conversion devices, such as an inverter or a converter mounted in, for example, an electric car or a hybrid car, a main circuit section having a semiconductor module is connected to a capacitor by a bus bar. Such power conversion devices may be configured such that a connecting section between a capacitor terminal and the bus bar is formed between the main circuit section and the capacitor (refer to Japanese Patent Laid-Opening Number JP-A-2009-5462). The capacitor terminal is extended towards the main circuit section side. The bus bar is connected to the capacitor terminal at a bus bar terminal formed towards the capacitor side. Therefore, the capacitor terminal and the bus bar overlap in a state in which the respective tip directions are opposite to each other at the connecting section therebetween.

However, when current flows to the overlapping portion in the connecting section between the capacitor terminal and the bus bar, current flowing in the same direction flows to the capacitor terminal and the bus bar. Therefore, an inductance reduction effect cannot be expected to be achieved in the overlapping portion. As a result, in terms of meeting demands for inductance reduction in the wiring portion between the capacitor and the main circuit section, there is room for improvement in the manner in which the capacitor terminal and the bus bar are connected.

In addition, for example, because a fastening means for fastening the capacitor terminal and the bus bar is required to be provided, the connecting section between the capacitor terminal and the bus bar is required to be sufficiently long. In other words, taking into consideration the strength of the connecting section, connection workability, and the like, the length of the connecting section is required to be long. Therefore, when the connecting section provided between the capacitor and the main circuit section is formed such that the capacitor terminal and the bus bar overlap in a state in which the respective tip directions are opposite of each other, the space between the main circuit section and the capacitor becomes wide. As a result, size reduction of the power conversion device may become difficult.

Therefore, a power conversion device is desired in which inductance reduction and size reduction can be facilitated.

SUMMARY

As a typical example, the present application provides a power conversion device having: a main circuit section that has a semiconductor module with a switching element therein and including a main electrode terminal; a capacitor with a capacitor element therein and that includes a capacitor terminal; and a bus bar that connects the main electrode terminal and the capacitor terminal. The capacitor terminal extends from a capacitor main body including the capacitor element therein towards the main circuit section side. At least one of either the bus bar or the capacitor terminal includes a bending section on a base end side of a connecting section between the bus bar and the capacitor terminal. The bus bar and the capacitor terminal are connected such as to overlap in a state in which respective tip directions match.

In the power conversion device configured as described above, the bus bar and the capacitor terminal overlap in a state in which the respective tip directions match. Therefore, when current flows to the connecting section between the bus bar and the capacitor terminal, the direction of the current flowing to the bus bar and the direction of the current flowing to the capacitor terminal become opposite of each other at the overlapping portion thereof. As a result, inductance can be reduced in the connecting section that is the overlapping portion.

In addition, the connecting section is formed such that the bus bar and the capacitor terminal overlap in a state in which the respective tip directions match. Therefore, even when the length of the connecting section becomes long, the space between the main circuit section and the capacitor does not increase. As a result, the space between the main circuit section and the capacitor can be reduced while sufficiently ensuring the length of the connecting section, taking into consideration the strength of the connecting section, connection workability, and the like. As a result, size reduction of the power conversion device can be facilitated.

Therefore, according to the exemplary embodiment, a power conversion device can be provided in which inductance reduction and size reduction can be facilitated.

In the power conversion device, the bus bar and the capacitor terminal can be connected, for example, by a fastening member such as a bolt, or by welding.

The bending section can be provided in the bus bar. In this instance, the shape of the capacitor terminal can be simplified.

The bus bar can be partially sealed by a resin mold section. The bending section can be exposed from the resin mold section. In this instance, insulation between the bus bar and areas that should be electrically insulated from the bus bar can be easily ensured. Freedom in wiring of the bus bar can be improved. Because the bending section is exposed from the resin mold section, interference between the resin mold section and the capacitor terminal can be easily prevented. Therefore, the shape of the capacitor terminal can be simplified, and the current path between the capacitor and the main circuit section can be shorted. As a result, inductance on the current path can be more easily reduced. In addition, when the bending section is configured to be exposed from the resin mold section, the bending section can be formed after the bus bar is resin-molded. Therefore, there is an advantage in that freedom of design is improved.

In addition, the tip direction of the connecting section can be made parallel with the array direction of the main circuit section and the capacitor. In this instance, the shape of the bus bar or the capacitor terminal can be easily simplified. In addition, because the connecting section does not project in the direction perpendicular to the array direction, the bulk in the direction perpendicular to the array direction can be reduced. The overall power conversion device can be made compact.

In addition, the capacitor main body can be configured such that the capacitor element and a sealing resin that seals the capacitor element are housed and disposed within a capacitor case having one open face. The capacitor element can be projected from the open face. The capacitor can be disposed such that the open face of the capacitor case faces the main circuit section. As a result of this configuration, the length of the current path of the capacitor element can be minimized. Inductance can be reduced. In addition, the shape of the capacitor element can be more easily simplified.

In addition, the main circuit section can be a stacked body in which the semiconductor module and a plurality of cooling members that cool the semiconductor module from both main surfaces are alternately stacked. The capacitor can be disposed on one end side of the main circuit section in the stacking direction of the stacked member. In this instance, size reduction of the power conversion device in the stacking direction can be achieved in addition to size reduction in the direction perpendicular to the stacking direction. In other words, as a result of the capacitor being disposed on one end of the main circuit section in the stacking direction of the stacked member, the dimension of the power conversion device in the direction perpendicular to the stacking direction can be reduced. On the other hand, as a result of the connection structure between the bus bar and the capacitor described above, the space between the main circuit section and the capacitor can be reduced, and the dimension of the power conversion device in the stacking direction can be minimized. The cooling member may be, for example, a cooling tube including a coolant flow path through which a cooling medium flows, or may be a heat sink composed of a heat-conducting member, such as a metal member.

In addition, the power conversion device preferably has a positive bus bar and a negative bus bar as the bus bars. The positive bus bar and the negative bus bar are preferably integrated by the resin mold section that partially seals the positive bus bar and the negative bus bar. In this instance, handling of the bus bar is facilitated. Assembly efficiency of the power conversion device can be improved.

DETAILED DESCRIPTION OF THE PREFERRED EMBODIMENTS (First Embodiment)

A power conversion device according to a first embodiment of the present invention will hereinafter be described with reference to FIG. 1 to FIG. 6.

Figure 1:
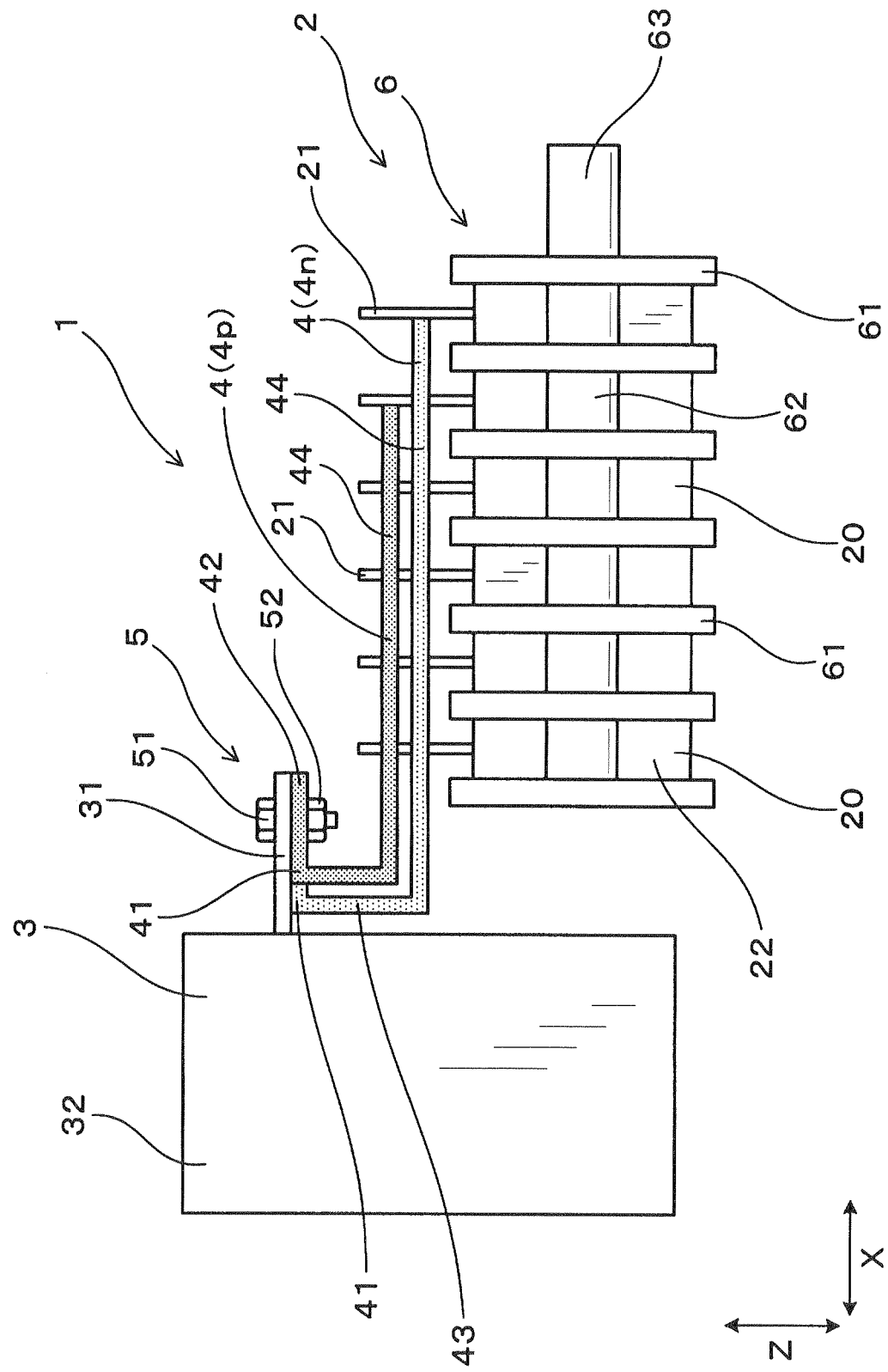
FIG. 1 shows a perspective view of a power conversion device according to a first embodiment.
Figure 2:
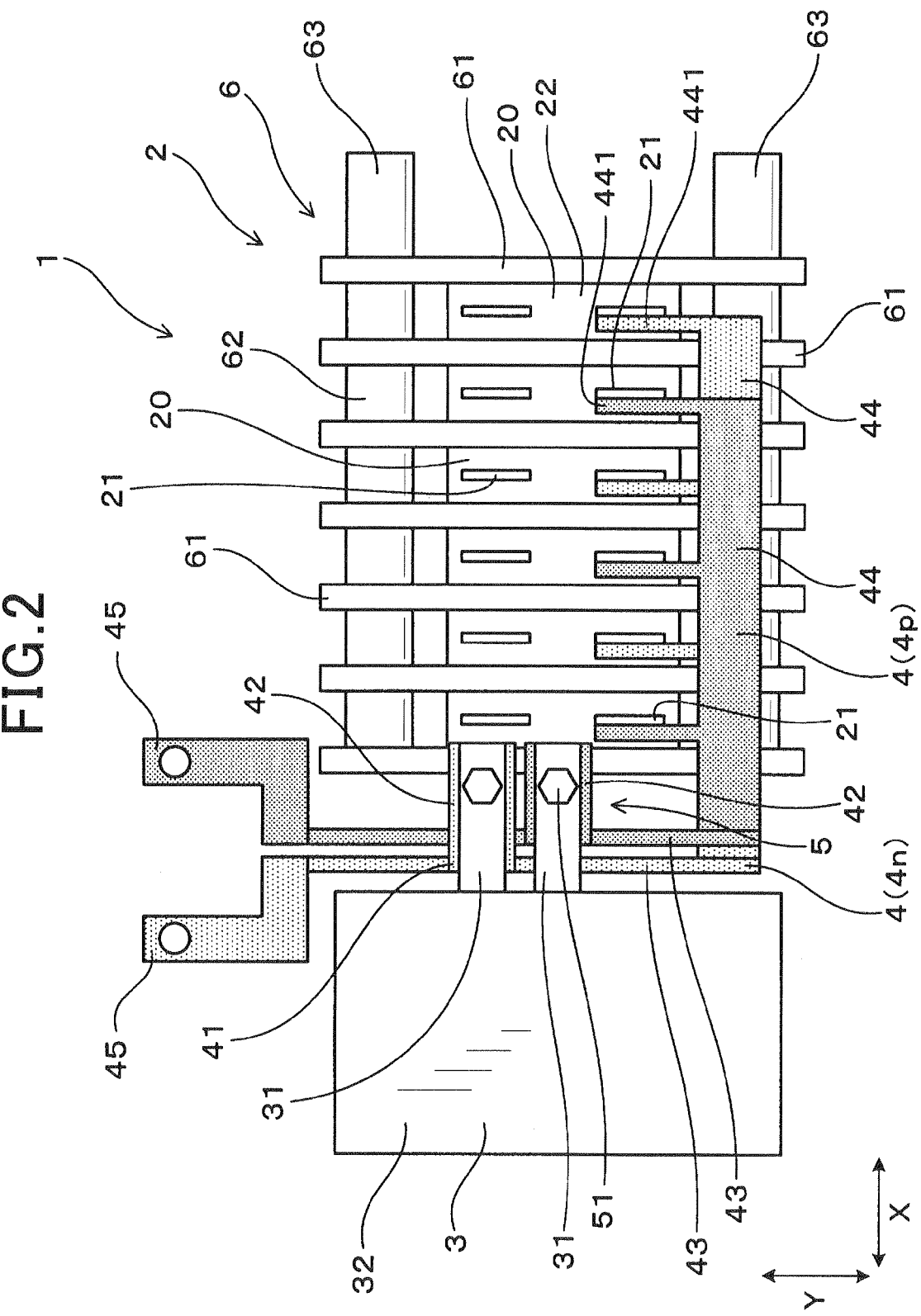
FIG. 2 shows a planar view of the power conversion device according to the first embodiment.

FIG. 1 illustrates a perspective view of the power conversion device according to the first embodiment. FIG. 2 illustrates a planar view of the power conversion device.

As shown in FIG. 1 and FIG. 2, a power conversion device 1 according to the first embodiment has a main circuit section 2, a capacitor 3, and a bus bar 4 that connects the main circuit section 2 and the capacitor 3. The main circuit section 2 has a semiconductor module 20. The semiconductor module 20 has a switching element therein and includes a main electrode terminal 21. The capacitor 3 has a capacitor element 320 therein and includes a capacitor terminal 31. The bus bar 4 connects the main electrode terminal 21 and the capacitor terminal 31.

Figure 3:
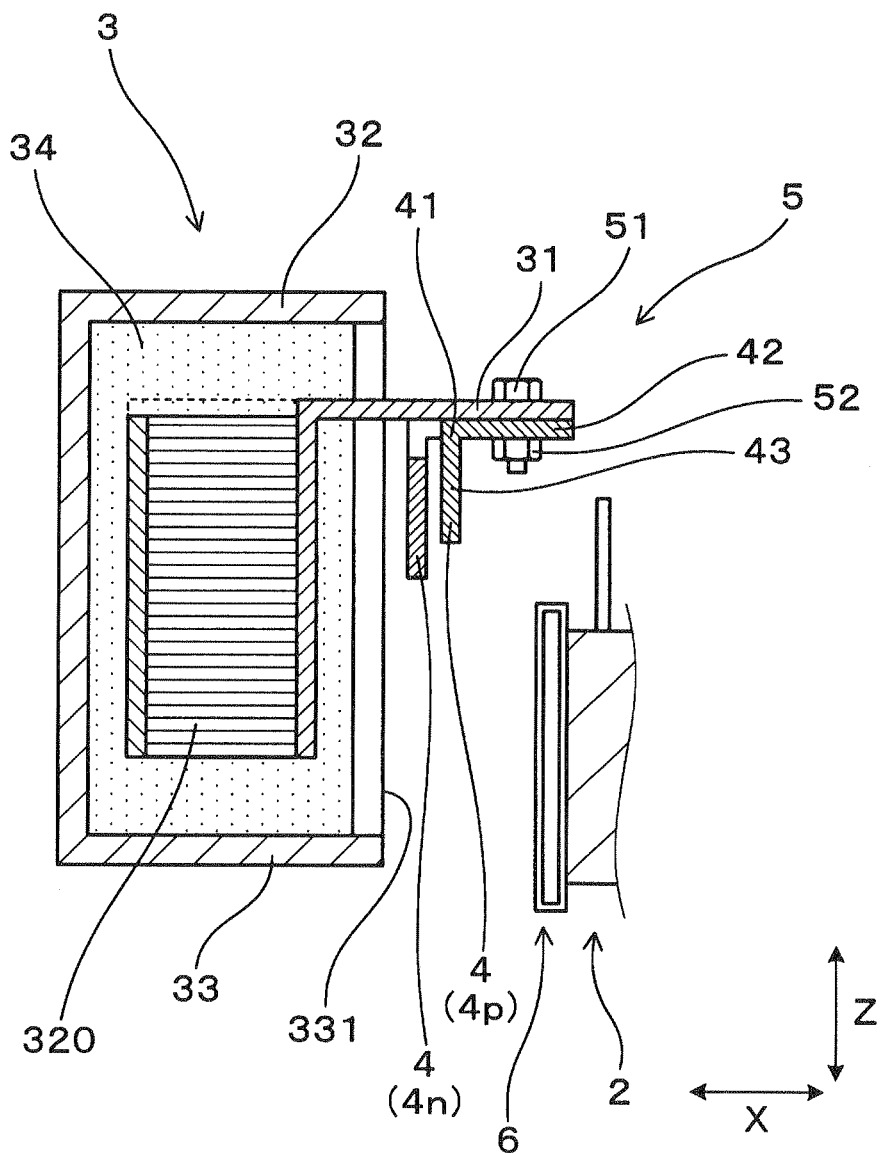
FIG. 3 shows a cross-sectional view of a capacitor according to the first embodiment.

FIG. 3 is a cross-sectional view of the capacitor 3 according to the first embodiment. As shown in FIG. 3, the capacitor terminal 31 extends from a capacitor main body 32 towards the main circuit section 2 side. The capacitor main body 32 has the capacitor element 320 therein. As shown in FIG. 1, the bus bar 4 includes a bending section 41 on a base end side of a connecting section 5 between the bus bar 4 and the capacitor terminal 31. The bus bar 4 and the capacitor terminal 31 are connected such as to overlap in a state in which respective tip directions match.

As shown in FIG. 1 and FIG. 2, the main circuit section 2 has a stacked member 6. In the stacked member 6, the semiconductor module 20 and a plurality of cooling tubes 61 are alternately stacked. The cooling tubes 61 are cooling members that cool the semiconductor module 20 from both main sides. According to the first embodiment, the stacked member 6 is configured by six semiconductor modules 20 and seven cooling tubes 61 that are alternately stacked. The cooling tubes 61 that are adjacent to each other in the stacking direction (referred to, accordingly, as direction X) of the stacked member 6 are connected to each other by a connecting tube 62 near both end portions in the length direction of the cooling tube 61. A pair of coolant intake and discharge tubes 63 for introducing and discharging a coolant into and from the cooling tubes 61 are attached to the cooling tube 61 disposed on one end in the X-direction.

The capacitor 3 is disposed on one end side of the main circuit section 2 in the X-direction of the stacked body 6. According to the first embodiment, the capacitor 3 is disposed in a position opposite to the coolant intake and discharge tubes 63.

In each semiconductor module 20, a pair of main electrode terminals 21 project in the same direction from an end face of a main body section 22 that has the semiconductor element therein. The projecting direction (referred to, accordingly, as direction Z) of the main electrode terminal 21 is perpendicular to both the direction X and the length direction (referred to, accordingly, as direction Y) of the cooling tube 61. Height direction Z and lateral direction Y are given for convenience and do not particularly limit the position of the power conversion device 1 in relation to the vertical direction.

Among the plurality of semiconductor modules 20, three semiconductor modules 20 configure an upper arm-side switching section in the main circuit section 2. The other three semiconductor modules 20 configure a lower arm-side switching section. One main electrode terminal 21 in the upper arm-side semiconductor module 20 is a positive terminal and connected to a positive bus bar 4p, described hereafter. One main electrode terminal 21 in the lower arm-side semiconductor module 20 is a negative terminal and connected to a negative bus bar 4n, described hereafter. The other main electrode terminal 21 of each semiconductor module 20 is an output terminal and connected to an output bus bar (not shown). The output bus bar is connected to an alternating-current load, such as an alternating-current rotating electric machine. The power conversion device 1 according to the first embodiment can be that which is mounted in a vehicle, such as an electric car or a hybrid car.

The power conversion device 1 has the positive bus bar 4p and the negative bus bar 4n as the bus bar 4. The positive bus bar 4p and the negative bus bar 4n are arranged in parallel with each other. Each bus bar 4 has main circuit connecting sections 44 in an area differing from bus bar terminals 42 that configure the connecting section 5 with the capacitor terminal 31. The main circuit connecting sections 44 connect with the main electrode terminals 21 of the plurality of semiconductor modules 20. The main circuit connecting sections 44 are adjacent to the stacked member 6 of the main circuit section 2 on the side from which the main electrode terminals 21 project and are formed along the direction X. In addition, the main circuit connecting sections 44 are disposed further outward in the direction Y than the main electrode terminals 21 of the semiconductor modules 20. The main circuit connecting section 44 is welded to the main electrode terminal 22 at a projecting portion 441 formed projecting towards the main electrode terminal 21 side in the direction Y. The main circuit connecting section 44 is disposed such that the thickness direction thereof is in the direction Z. The pair of bus bars 4 are arranged such as to overlap in the thickness direction with space therebetween at the main circuit connecting sections 44.

Figure 4:
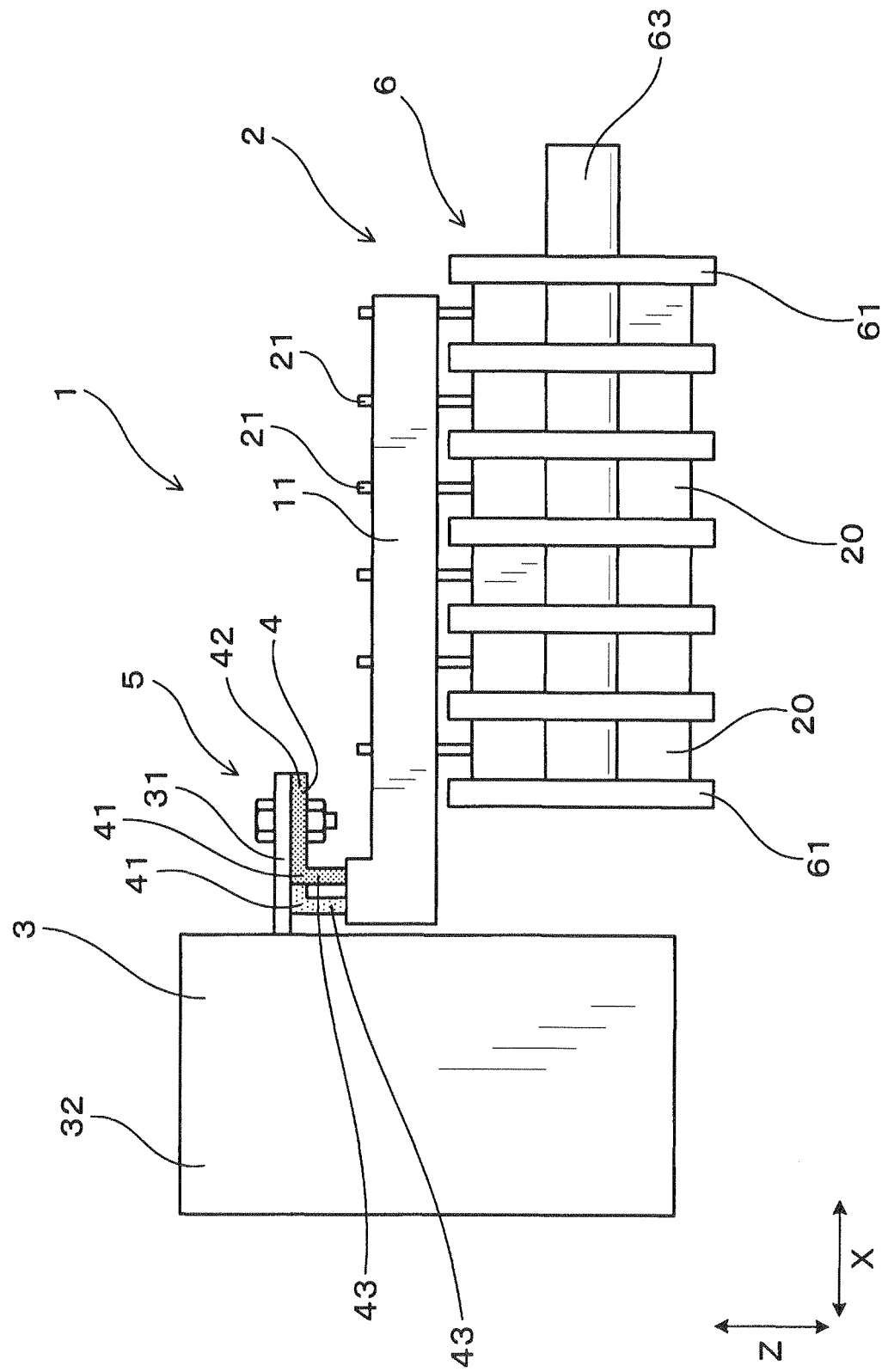
FIG. 4 shows a perspective view of the power conversion device showing a resin mold section according to the first embodiment.
Figure 5:
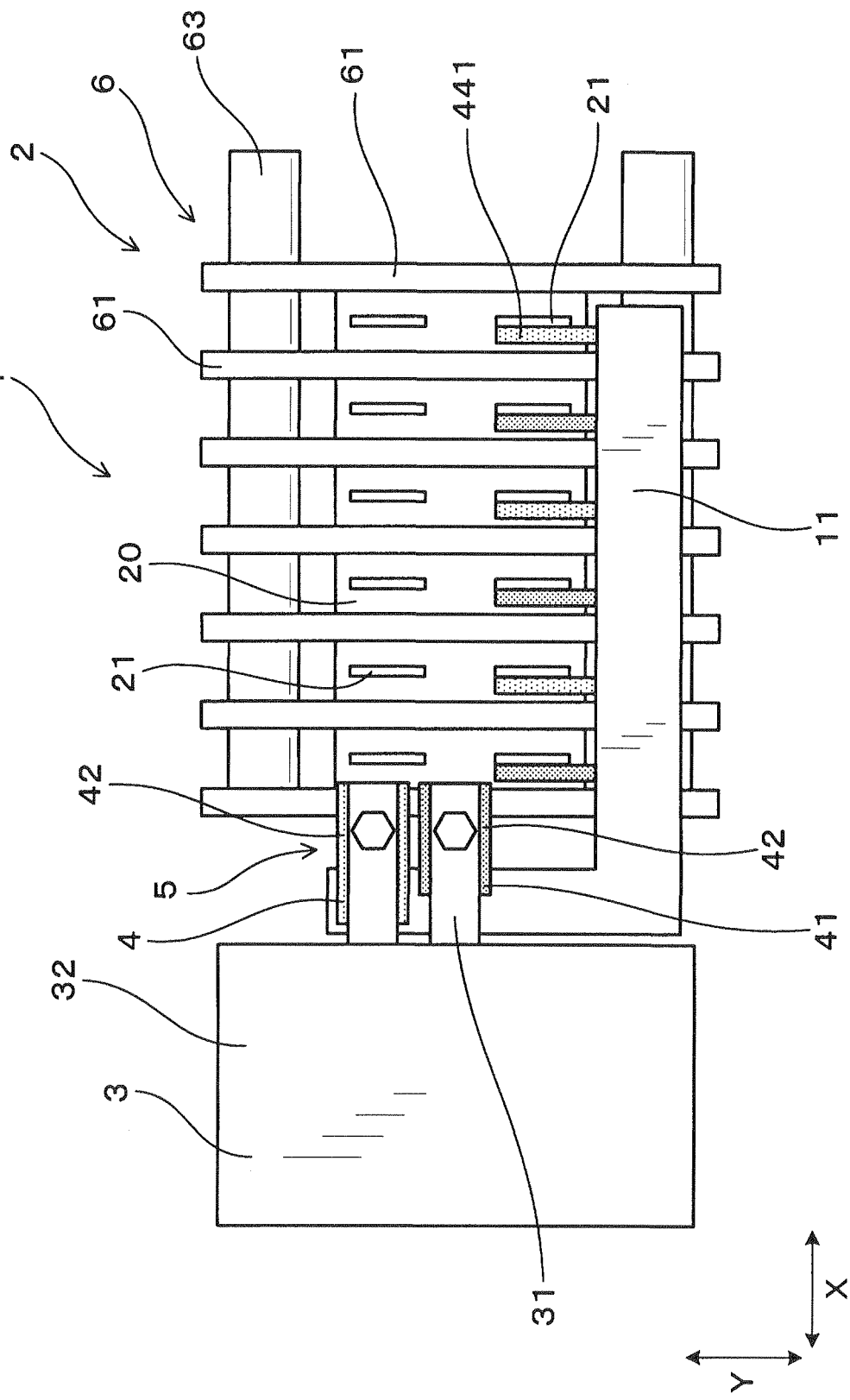
FIG. 5 shows a planar view of the power conversion device showing the resin mold section according to the first embodiment.

FIG. 4 illustrates a perspective view of the power conversion device 1 showing a resin mold section according to the first embodiment. FIG. 5 illustrates a planar view of the resin mold section. As shown in FIG. 4 and FIG. 5, the positive bus bar 4p and the negative bus bar 4n are integrated by a resin mold section 11 that partially seals the positive bus bar 4p and the negative bus bar 4n. The resin mold section 11 integrates the positive bus bar 4p and the negative bus bar 4n while providing a predetermined amount of space and insulating therebetween. The resin mold section 11 seals portions of the main circuit connecting section 44 of the bus bar 4 excluding the connecting portion (projecting portion 441) with the main electrode terminal 21 of the semiconductor module 20. In FIG. 1 to FIG. 3, the resin mold section 11 is omitted for convenience. This similarly applies to FIG. 7 to FIG. 14, described hereafter.

As shown in FIG. 1, each bus bar 4 has a joining section 43 as a portion that joins the main circuit connecting section 44 and the bus bar terminal 42. The joining section 43 is right-angle in the direction away from the main circuit section 2 in the direction Z, from one end of the main circuit connecting section 44 on the capacitor 3 side. As shown in FIG. 2, the joining section 43 extends from the main circuit connecting section 44 in the Y direction, and forms an input terminal 45 in an extending-side end portion opposite to the main circuit connecting section 44. In the drawings other than FIG. 2, the input terminal 45 is omitted. The pair of bus bars 4 are disposed such as to overlap each other with a predetermined amount of space therebetween in the thickness direction at the joining sections 43 as well. In other words, at the joining sections 43, the pair of bus bars 4 are disposed such as to be stacked with a predetermined amount of space therebetween in the stacking direction X.

In addition, the bus bar terminal 42 extends towards the main circuit section 2 side from a position between the main circuit connecting section 44 and the input terminal 45, with the bending section 41 therebetween. In other words, as shown in FIG. 1, the joining section 43 is connected to the base end portion of the bus bar terminal 42 with the bending section 41 therebetween, in the end portion opposite to the main circuit connecting section 44 in the direction Z. The bending section 42 is formed into a right angle.

The tip direction of the connecting section 5 between the capacitor terminal 31 and the bus bar terminal 42 is parallel with the array direction of the main circuit section 2 and the capacitor 3, or in other words, the direction X, and faces the main circuit section 2 side. The capacitor terminal 31 and the bus bar terminal 42 overlap each other and are fastened together by a bolt 51 and a nut 52, thereby configuring the connecting section 5. As shown in FIG. 2, a pair of connecting sections 5 are formed in correspondence with the pair of bus bars 4 and the pair of capacitor terminals 31. The pair of connecting sections 5 are formed such as to be parallel with each other in the direction Y.

As shown in FIG. 4 and FIG. 5, in the bus bar 4, the bending section 41 is exposed from the resin mold section 11. In other words, the resin mold section 11 seals a portion of the main circuit connecting section 44 as described above, and also seals a portion of the joining section 43. In the bus bar 4, a portion of the joining section 43 on the side near the bending section 41 is exposed from the resin mold section 11. In addition, the bending section 41 and the bus bar terminal 42 are exposed from the resin mold section 11.

The capacitor terminal 31 is disposed such as to overlap the bus bar terminal 42 exposed in this way, from the side opposite to the main circuit section 2 in the direction Z. The capacitor terminal 31 projects straight from the capacitor main body 32 towards the main circuit section 2 side in the direction X. As shown in FIG. 3, the capacitor main body 32 is configured such that the capacitor element 320 and a sealing resin 34 sealing the capacitor element 320 are housed within a capacitor case 33 that includes an open face 331 on one side. The capacitor terminal 31 projects from the open face 331. The capacitor 3 is disposed such that the open face 331 of the capacitor case 33 faces the main circuit section 2.

In addition, the capacitor main body 32 projects towards the projecting side of the main electrode terminal 21 in relation to the stacked member 6 of the main circuit section 2 in the direction Z. The capacitor terminal 31 is disposed further towards the tip side than the tip of the main electrode terminal 21 in the direction Z. The connecting section 5 between the capacitor terminal 31 and the bus bar terminal 42 is positioned further towards the projecting side of the main electrode terminal 21 than the stacked member 6 in the direction Z and further towards the main circuit section 2 side than an end edge of the capacitor main body 32 in this direction. In addition, when viewed from the direction Z, the connecting section 5 partially overlaps with the stacked member 6.

Figure 6:
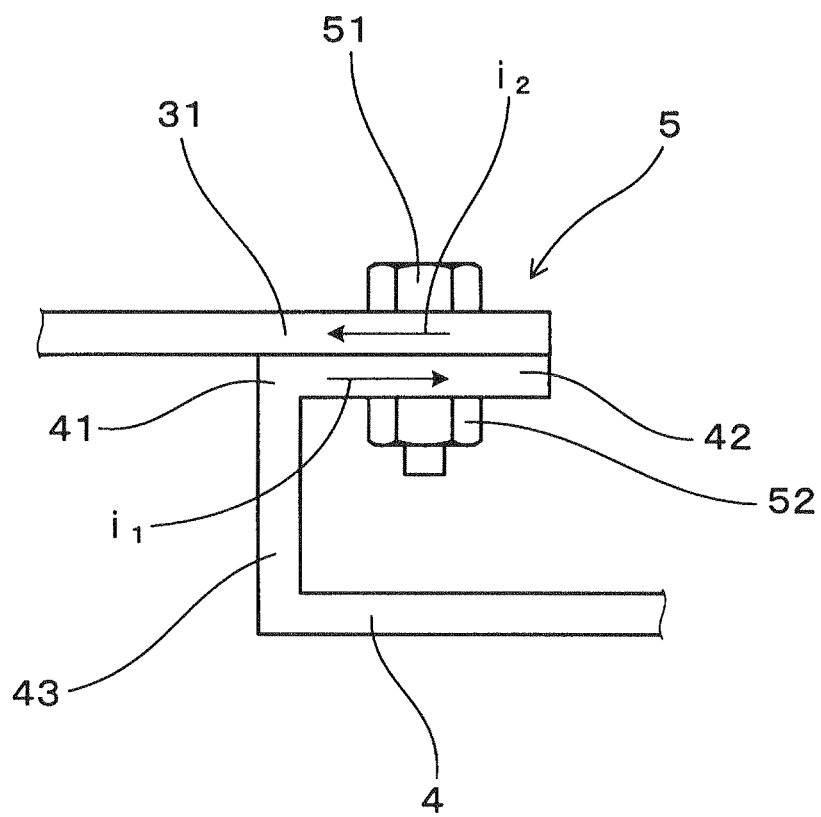
FIG. 6 shows a diagram of current flowing to a connecting section according to the first embodiment.

Next, working effects of the power conversion device 1 according to the first embodiment will be described. FIG. 6 shows the current flowing to the connecting section 5 according to the first embodiment. In the power conversion device 1, the bus bar 4 (bus bar terminal 42) and the capacitor terminal 31 overlap such that the respective tip directions match. As a result, when current flows to the connecting section 5 between the bus bar 4 and the capacitor terminal 31, as shown in FIG. 6, the direction (arrow $i_1$) of the current flowing to the bus bar 4 and the direction of the current (arrow $i_2$) flowing to the capacitor terminal 31 become opposite at the overlapping portion of the bus bar 4 and the capacitor terminal 31. Therefore, inductance can be reduced in the connecting section 5 that is the overlapping portion.

In addition, the connecting section 5 is formed such that the bus bar 4 and the capacitor terminal 31 overlap in a state in which the respective tip directions match. Therefore, even when the length of the connecting section 5 becomes long, the space between the main circuit section 2 and the capacitor 3 can be made short. As a result, the space between the main circuit section 2 and the capacitor 3 can be reduced while sufficiently ensuring the length of the connecting section 5, taking into consideration the strength of the connecting section 5, connection workability, and the like. As a result, size reduction of the power conversion device 1 can be facilitated.

In addition, the bending section 41 is formed in the bus bar 4. Therefore, the shape of the capacitor terminal 31 can be simplified. In other words, the capacitor terminal 31 and the bus bar terminal 41 can be overlapped in a state in which the tip directions match without the capacitor terminal 31 being particularly bent.

In addition, the tip direction of the connecting section 5 is parallel with the array direction of the main circuit section 2 and the capacitor 3. Therefore, the shape of the capacitor terminal 31 can be easily simplified. In this instance, the connecting section 5 does not project in the direction perpendicular to the array direction. Therefore, the bulk of the power conversion device 1 in the direction perpendicular to the array direction can be reduced, and the power conversion device 1 can be made compact.

In addition, the capacitor 3 is disposed such that the open face 331 of the capacitor case 33 faces the main circuit section 2. Therefore, the length of the current path of the capacitor terminal 31 can be minimized. Inductance can be reduced. In addition, the shape of the capacitor terminal 31 can be easily simplified.

In addition, the capacitor 3 is disposed on one end side of the main circuit section 2 in the stacking direction X of the stacked member 6 composed of the semiconductor modules 20 and the cooling tubes 61. Therefore, size reduction of the power conversion device 1 in the direction X can be achieved in addition to size reduction of the power conversion device 1 in the direction Y perpendicular to the stacking direction X. In other words, as a result of the capacitor 3 being disposed on one end side of the main circuit section 2 in the stacking direction X of the stacked member 6, the dimension of the power conversion device 1 in the direction Y perpendicular to the stacking direction X can be reduced. On the other hand, as a result of the connection structure of the bus bar 4 and the capacitor terminal 31, described above, the space between the main circuit section 2 and the capacitor 3 can be reduced, and the dimension of the power conversion device 1 in the direction X can be minimized.

In addition, the bus bar 4 is partially sealed by the resin mold section 11. The bending section 41 is exposed from the resin mold section 11. As a result, insulation between the bus bar 4 and areas that should be electrically insulated from the bus bar 4 can be easily ensured. Freedom in wiring of the bus bar 4 can be improved. In addition, the bending section 41 is exposed from the resin mold section 11. Therefore, interference between the resin mold section 11 and the capacitor terminal 31 can be easily prevented. As a result, the shape of the capacitor terminal 31 can be simplified, and the current path between the capacitor 3 and the main circuit section 2 can be shorted. As a result, the inductance on the current path can be more easily reduced.

In addition, the configuration in which the bending section 41 is exposed from the resin mold section 11 enables the bending section 41 to be formed after resin-molding of the bus bar 4, as shown, for example, in a second embodiment, described hereafter. Therefore, there is also an advantage in that freedom of design is improved.

As described above, according to the first embodiment, a power conversion device can be provided in which inductance reduction and size reduction are facilitated.

(Second Embodiment)

A power conversion device according to a second embodiment will hereinafter be described with reference to FIG. 7 to FIG. 10.

Figure 7:
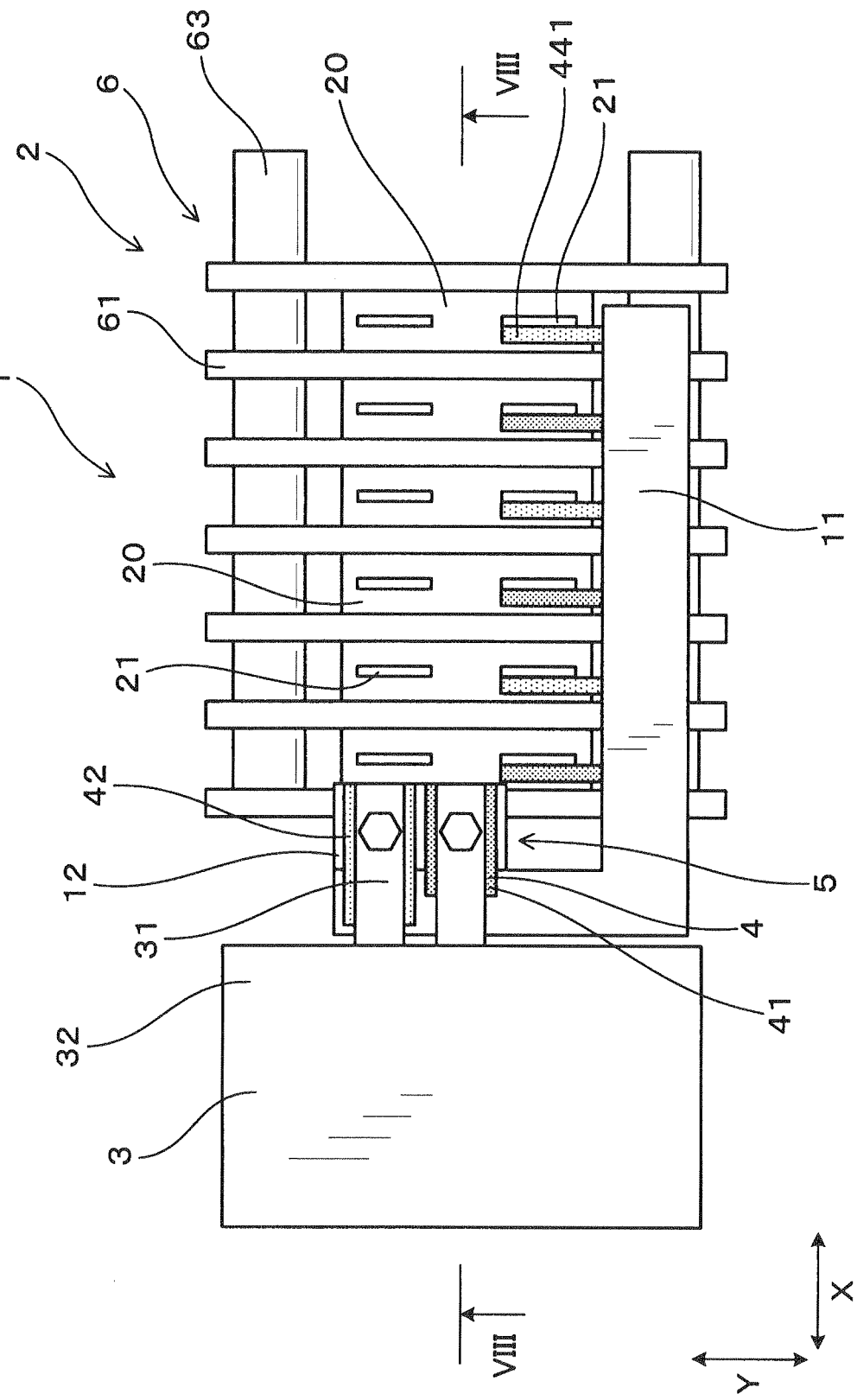
FIG. 7 shows a planar view of a power conversion device according to a second embodiment.
Figure 8:
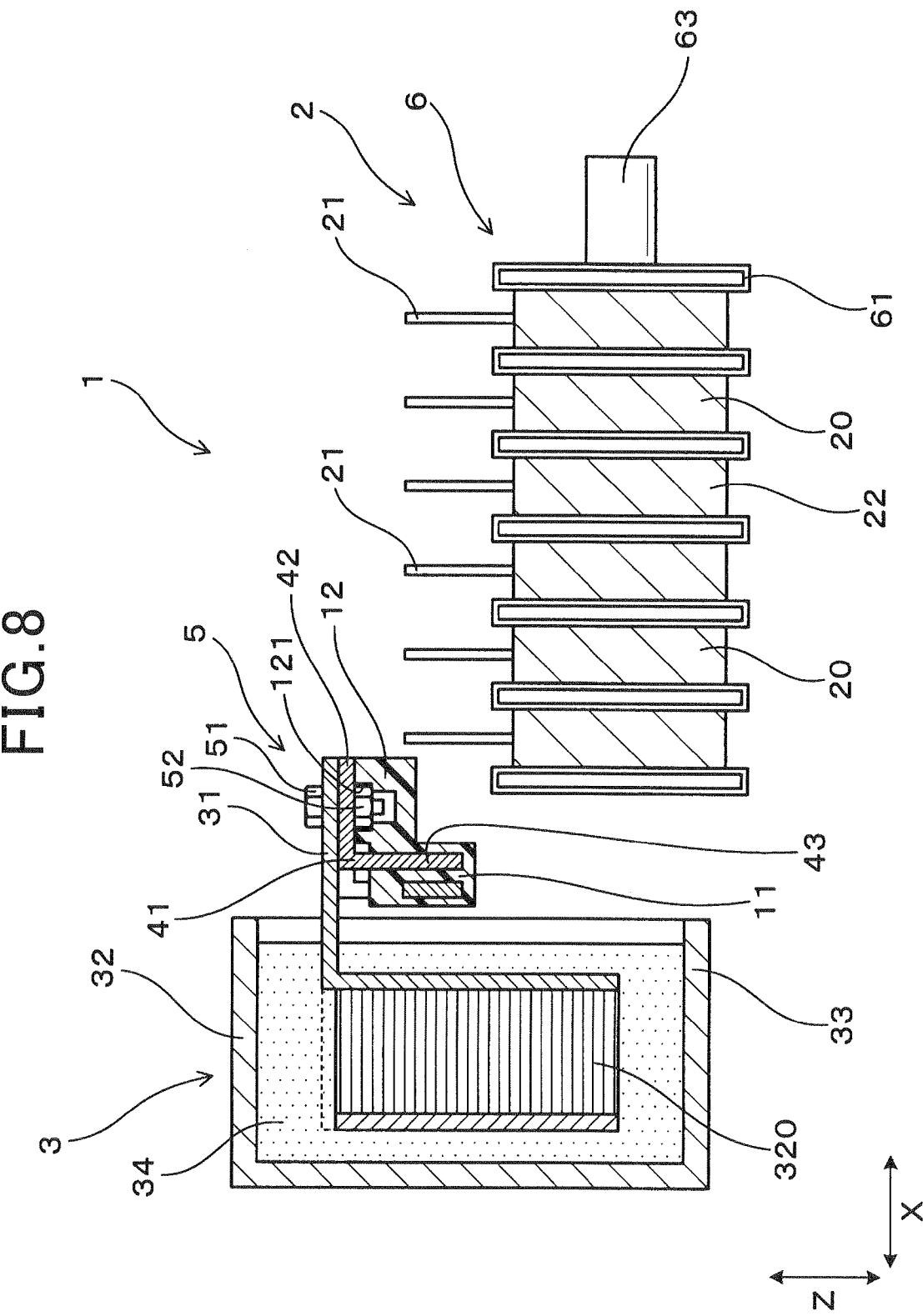
FIG. 8 shows a cross-sectional view taken along line VIII-VIII and viewed from the arrow in FIG. 7.
Figure 9:
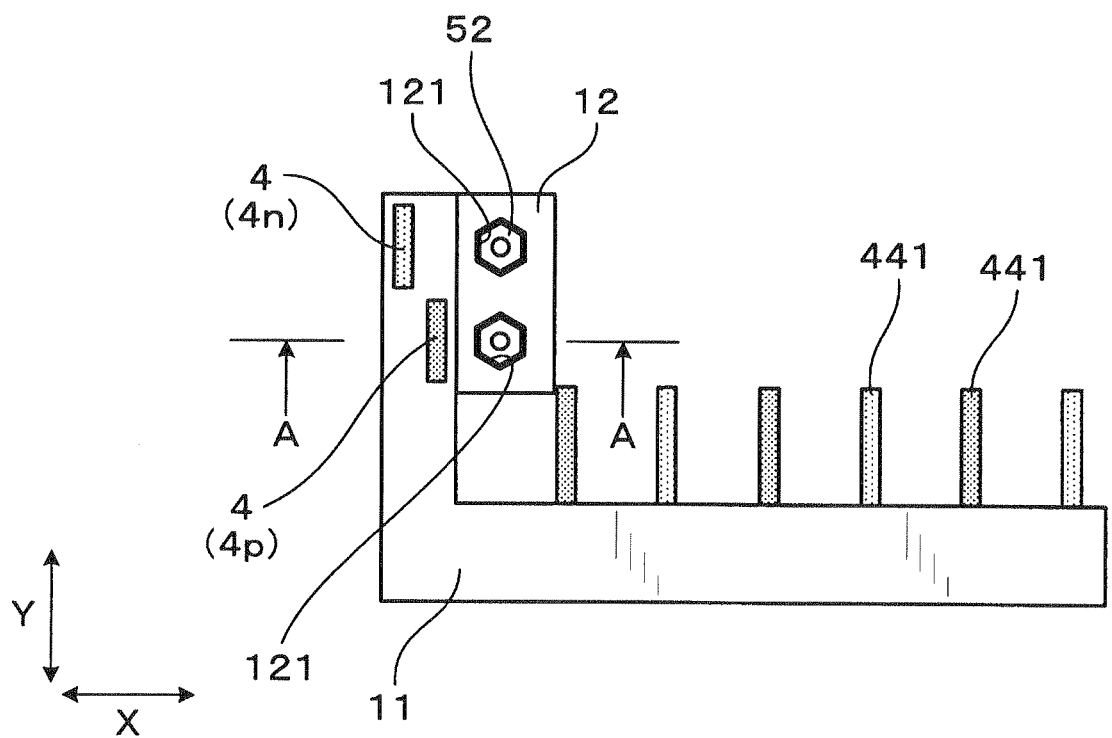
FIG. 9 shows a planar view of an assembly procedure of the power conversion device according to the second embodiment.
Figure 10:
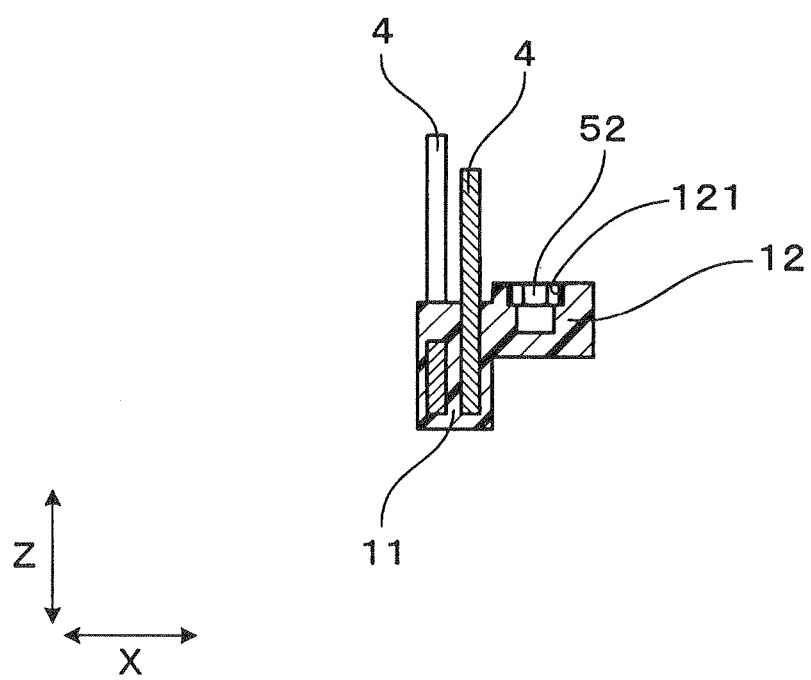
FIG. 10 shows a cross-sectional view taken along line A-A and viewed from the arrow in FIG. 9.

FIG. 7 illustrates a planar view of the power conversion device according to the second embodiment. FIG. 8 illustrates a cross-sectional view taken along line VIII-VIII and viewed from the arrow in FIG. 7. FIG. 9 illustrates a planar view of an assembly procedure of the power conversion device according to the second embodiment, FIG. 10 is a cross-sectional view taken along line A-A and viewed from the arrow in FIG. 9.

As shown in FIG. 7 to FIG. 10, the second embodiment is an example in which a terminal block 12 for the connecting section 5 is provided in the resin mold section 11. In other words, as shown in FIG. 7 and FIG. 8, the terminal block 12 is formed integrally with the resin mold section 11 in which the pair of bus bars 4 are molded. The terminal block 12 is configured such that the bus bar terminal 42 can be placed thereon in a state overlapping with the capacitor terminal 31. A pair of nut holding sections 121 that house and hold the nuts 52 are formed in the terminal block 12 such as to be open on the placement face of the bus bar terminal 42. The pair of bus bar terminals 42 and the pair of capacitor terminals 31 are fastened and fixed on the terminal block 12 by the bolts 51 and the nuts 52, thereby configuring the connecting section 5.

In addition, when the bus bar 4 and the capacitor terminal 31 are connected, for example, the following procedure is used. In other words, first, as shown in FIG. 9 and FIG. 10, the pair of bus bars 4 molded by the resin mold section 11 are prepared. At this stage, the bending section 41 is not formed in the bus bar 4. The end portion of the bus bar 4 is in a state extending directly from the joining section 43 in the height direction Z. In this state, the nut holding section 121 in the resin mold section 11 is open in the direction Z. The nut 52 is placed in each of the pair of nut holding sections 121. A slight space is provided between the nut holding section 121 and the nut 52. However, the nut holding section 121 is configured to restrict the rotation of the nut 52.

After the nut 52 is placed in the nut holding section 121, the bus bar 4 is bent towards the main circuit section 2 side, and the bending section 41 having a right angle is formed (see FIG. 8). As a result, the bus bar terminal 42 that is the portion further towards the tip side than the bending section 41 is placed along the terminal block 12 and covers the nut holding section 121.

Next, as shown in FIG. 7 and FIG. 8, the pair of bus bars 4 are connected, such as by welding, to the plurality of semiconductor modules 20 of the main circuit section 2, at the projecting sections 441. Next, the capacitor 3 is placed in a predetermined position such that the pair of capacitor terminals 31 respectively overlap the pair of bus bar terminals 42 disposed along the terminal block 12, as described above.

Then, the bolt 51 is inserted into a bolt insertion hole (not shown) formed in the capacitor terminal 31 and the bus bar terminal 42, and the bolt 51 is fastened to the nut 52 in the terminal block 12. As a result, as shown in FIG. 7 and FIG. 8, the pair of capacitor terminals 31 and bus bar terminals 42 are each fastened on the terminal block 12, thereby forming the connecting section 5. Other configurations are similar to those according to the first embodiment. Among the reference numbers used in the drawings related to the second embodiment, reference numbers that are the same as those used in the first embodiment indicate constituent elements and the like similar to those according to the first embodiment, unless indicated otherwise.

According to the second embodiment, the connecting section 5 can be easily formed. Assembly efficiency of the power conversion device 1 can be improved. In addition, because the bending section 41 of the bus bar 4 is configured such as to be exposed from the resin mold section 11, the connecting procedure described above can be actualized. From this perspective as well, the bending section 41 is preferably exposed from the resin mold section 11. Other working effects similar to those according to the first embodiment can be achieved.

(Third Embodiment)

Figure 11:
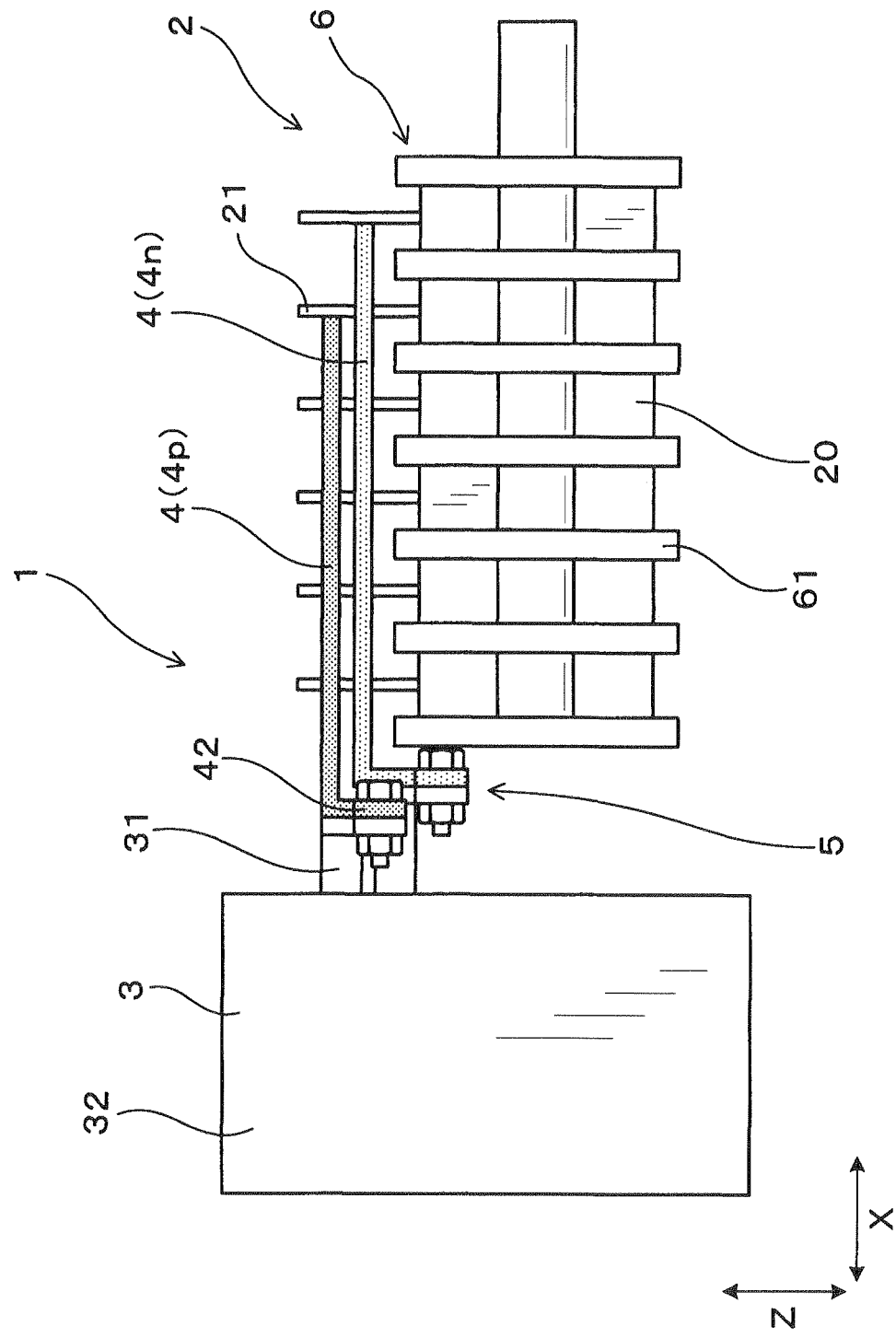
FIG. 11 shows a perspective view of a power conversion device according to a third embodiment.
Figure 12:
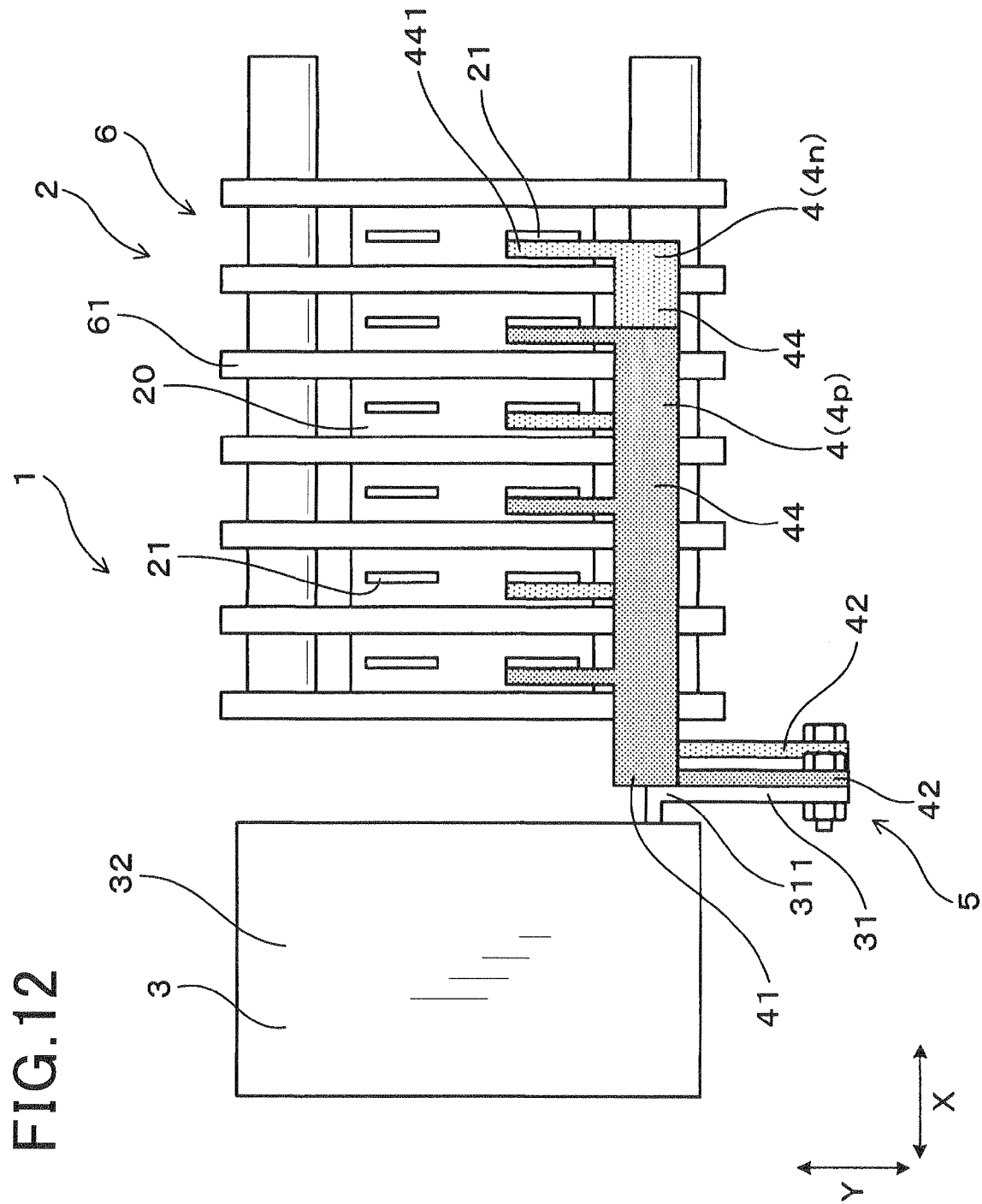
FIG. 12 shows a planar view of the power conversion device according to the third embodiment.

The power conversion device 1 according to a third embodiment will be described with reference to FIG. 11 and FIG. 12. FIG. 11 is a perspective view of the power conversion device 1 according to the third embodiment. FIG. 12 illustrates a planar view of the power conversion device 1. As shown in FIG. 11 and FIG. 12, the third embodiment is an example in which bending sections 311 and 411 are provided in both the capacitor terminal 31 and the bus bar 4. According to the third embodiment, the bending sections 311 and 411 are both right angles. The bending sections 311 and 411 bend towards the lateral direction Y. The tip direction of the connecting section 5 between the capacitor terminal 31 and the bus bar terminal 42 faces the direction Y. In addition, the connecting section 5 protrudes further outward in the direction Y than the stacked member 6 and the capacitor main body 32. Other configurations are similar to those according to the first embodiment. Among the reference numbers used in the drawings related to the third embodiment, reference numbers that are the same as those used in the first embodiment indicate constituent elements and the like similar to those according to the first embodiment, unless indicated otherwise.

According to the third embodiment, the capacitor terminal 31 and the bus bar terminal 42 protrude outside from the stacked member and the capacitor main body 32. Therefore, connection therebetween can be facilitated. Other working effects similar to those according to the first embodiment can be achieved.

(Fourth Embodiment)

Figure 13:
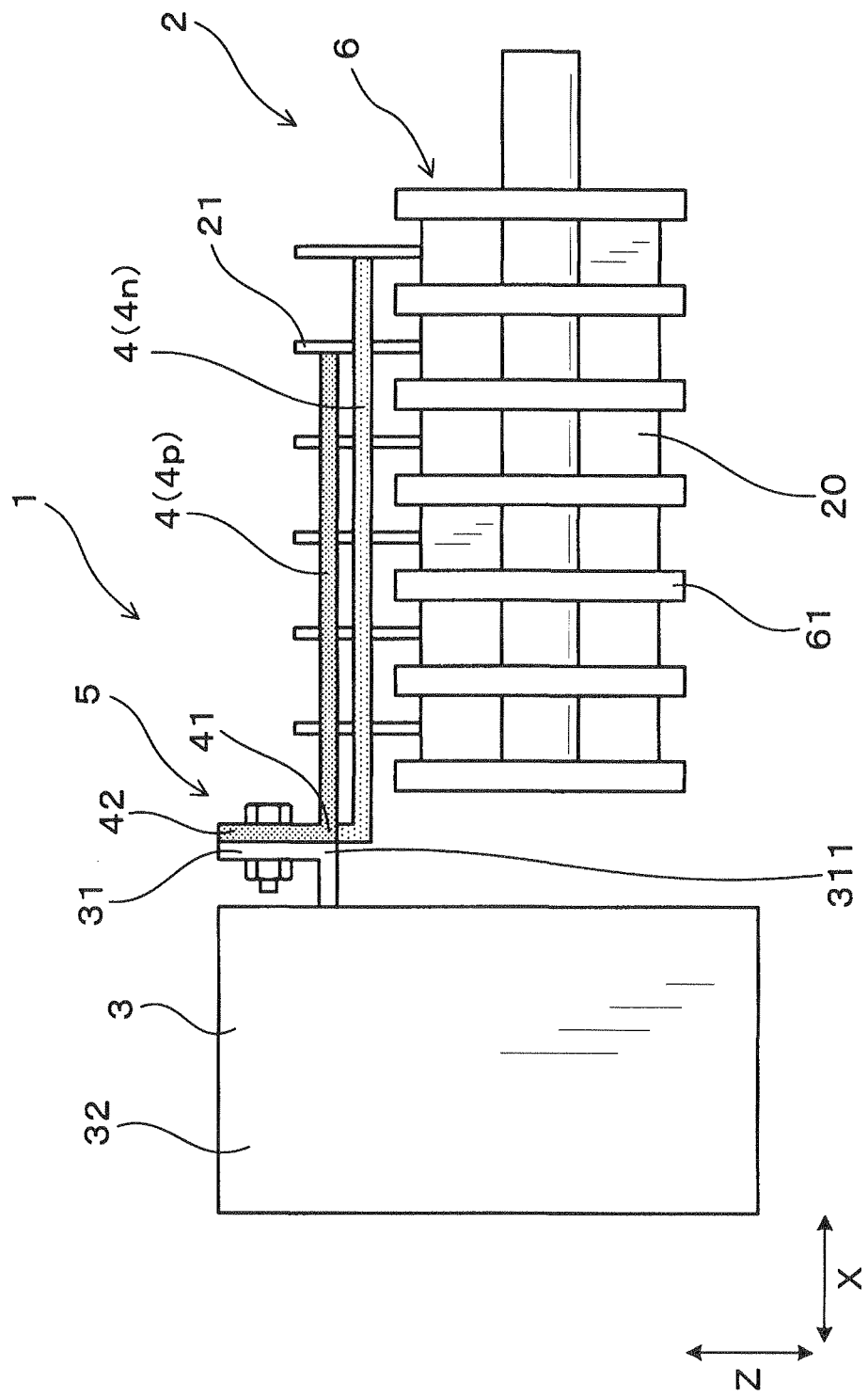
FIG. 13 shows a perspective view of a power conversion device according to a fourth embodiment.
Figure 14:
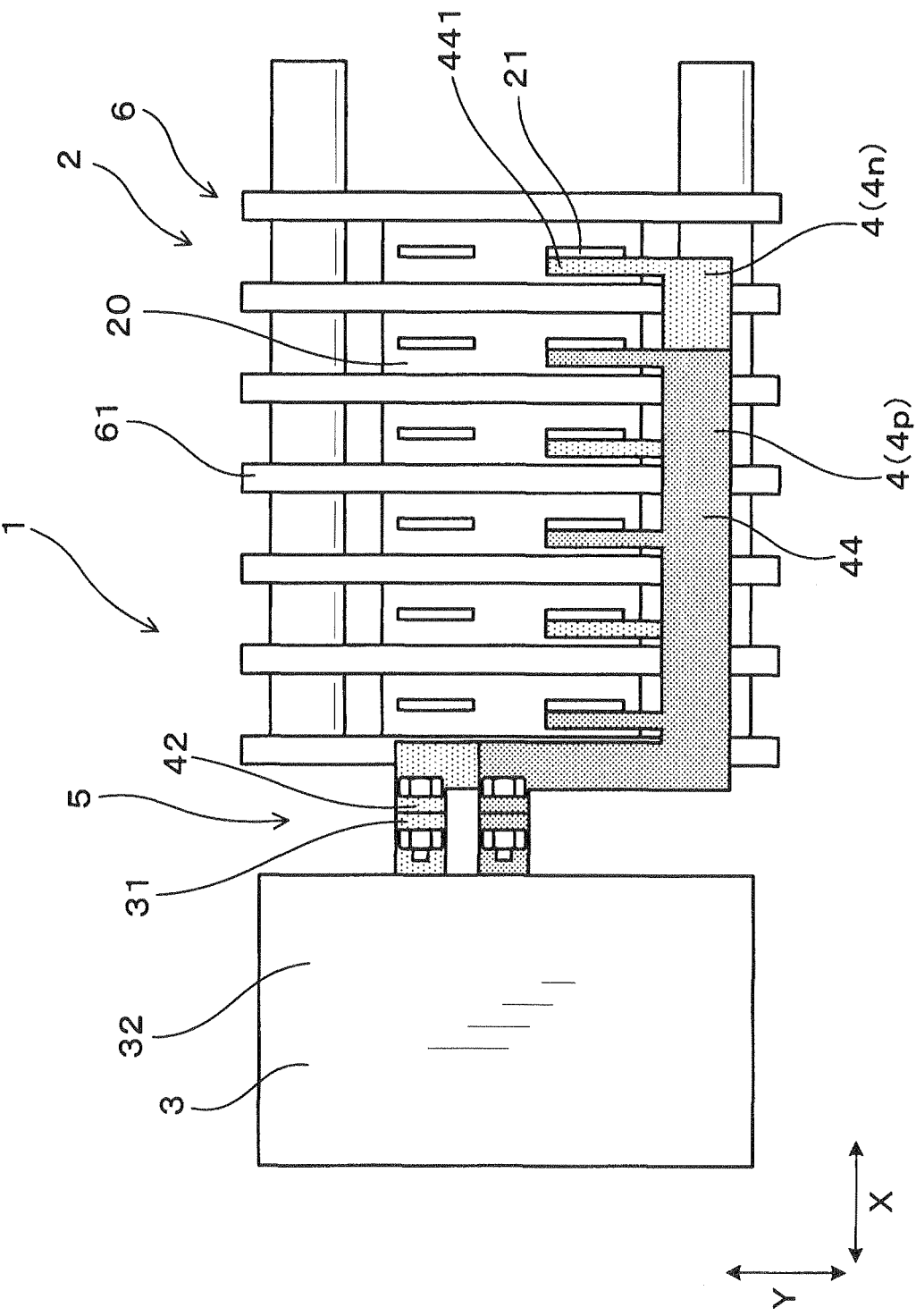
FIG. 14 shows a planar view of the power conversion device according to the fourth embodiment.

The power conversion device 1 according to a fourth embodiment will be described with reference to FIG. 13 and FIG. 14. FIG. 13 is a perspective view of the power conversion device 1 according to the fourth embodiment. FIG. 14 illustrates a planar view of the power conversion device 1. As shown in FIG. 11 and FIG. 12, the fourth embodiment is also an example in which the bending sections 311 and 411 are provided in both the capacitor terminal 31 and the bus bar 4. However, the fourth embodiment differs from the third embodiment in that the bending direction of the bending sections 311 and 411 is the height direction Z rather than the direction Y according to the third embodiment.

The tip direction of the connecting section 5 between the capacitor terminal 31 and the bus bar terminal 42 is the height direction Z, and faces the projecting side of the main electrode terminal 21 of the semiconductor module 20. Other configurations are similar to those according to the first embodiment. Among the reference numbers used in the drawings related to the fourth embodiment, reference numbers that are the same as those used in the first embodiment indicate constituent elements and the like similar to those according to the first embodiment, unless indicated otherwise.

According to the fourth embodiment, the tip direction of the connecting section 5 is the same as the projecting direction of the main electrode terminal 21. Therefore, connection work of the connecting section 5 is facilitated. Other working effects similar to those according to the first embodiment can be achieved.

According to the above-described first to fourth embodiments, the bolt 51 and nut 52 are used as the connecting means of the connecting section 5. However, the connecting means is not limited thereto. For example, the connecting section 5 can be welded or the like. In particular, according to the third embodiment and the fourth embodiment, the tip direction of the connecting section 5 faces the direction Y perpendicular to the stacking direction X. Therefore, in terms of connection workability, welding can be easily used. Furthermore, according to the fourth embodiment, the tip direction of the connecting section 5 is the same as the projecting direction of the main electrode terminal 21. Therefore, as a result of welding to the main electrode terminal 21 and welding to the capacitor terminal 31 being performed successively, production efficiency can be particularly improved.

Moreover, in addition to the above-described first to fourth embodiments, various configurations can be used in the power conversion device 1. In other words, for example, rather than the bending section being provided in the bus bar 4, the bending section can be provided only in the capacitor terminal. In addition, the angle of the bending section is not limited to the right angle, and may be an obtuse angle or an acute angle. Furthermore, the bending section may be a curved shape.

(Comparison Example)

Figure 15:
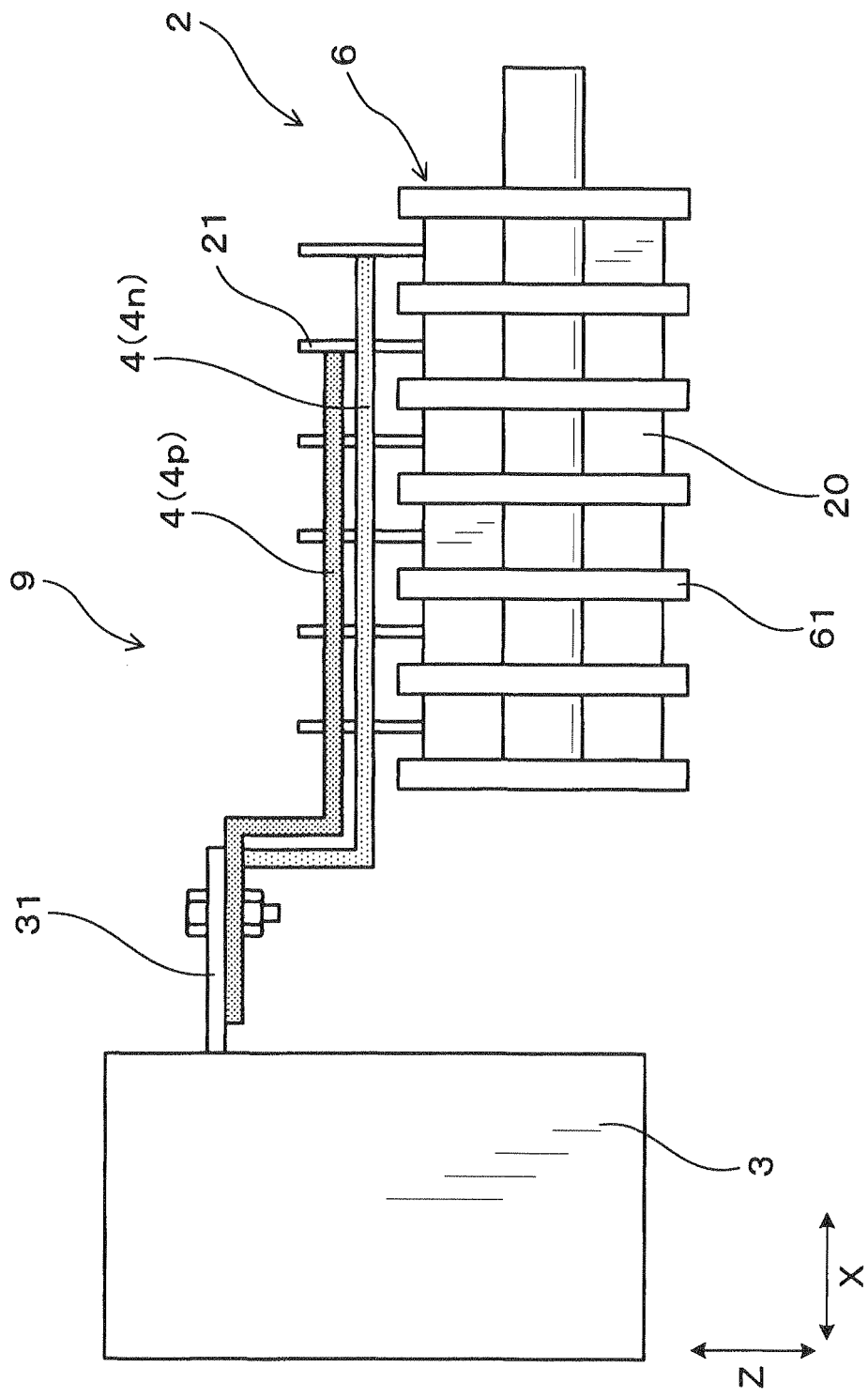
FIG. 15 shows a perspective view of a power conversion device of a comparison example.
Figure 16:
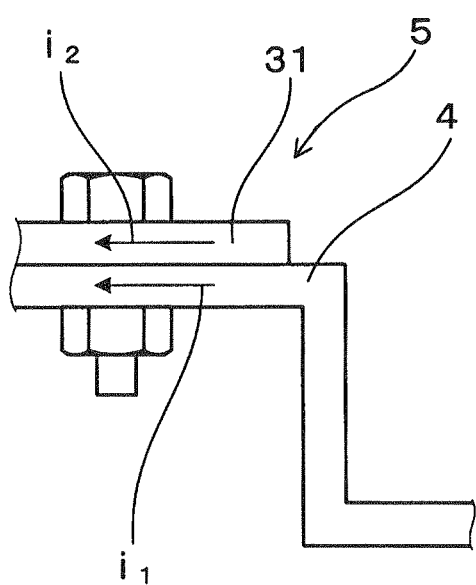
FIG. 16 shows a diagram of current flowing to a connecting section in the comparison example.

A comparison example of the power conversion device will hereinafter be described with reference to FIG. 15 and FIG. 16. FIG. 15 is a perspective view of the power conversion device of the comparison example. FIG. 16 illustrates a diagram of the current flowing to the connecting section in the comparison example. As shown in FIG. 15, the comparison example is an example of a power conversion device 9 in which the bus bar 4 and the capacitor terminal 31 are connected such that the respective tip directions are opposite of each other. Other configurations are similar to those according to the first embodiment. Among the reference numbers used in the drawings related to the comparison example, reference numbers that are the same as those used in the first embodiment indicate constituent elements and the like similar to those according to the first embodiment, unless indicated otherwise.

In the comparison example, when current flows to the overlapping portion in the connecting section 5 between the capacitor 31 and the bus bar 4, as shown in FIG. 16, current flowing in the same direction flows to the capacitor terminal 31 and the bus bar 4 (arrows $i_1$ and $i_2$). Therefore, an induction reduction effect cannot be expected to be achieved in the overlapping portion. In addition, when the length of the connecting section 5 is made long, taking into consideration the strength of the connecting section 5, connection workability, and the like, the space between the main circuit section 2 and the capacitor 3 increases. As a result, size reduction of the power conversion device 9 becomes difficult. On the other hand, in the power conversion device 1 according to the first to fourth embodiments, inductance reduction and size reduction are facilitated as described above.

What is claimed is:

1. A power conversion device comprising:
a main circuit section that has a semiconductor module incorporating a switching element and including a main electrode terminal;
a capacitor that incorporates a capacitor element and includes a capacitor terminal; and
a bus bar that connects between the main electrode terminal and the capacitor terminal, wherein:
the capacitor terminal is extended toward the main circuit section from a capacitor body incorporating the capacitor element;
at least one of the bus bar and the capacitor terminal includes a bending portion on a base end side of a connecting section between the both;
the bus bar and the capacitor terminal are overlapped with each other in a state where each other's tip directions are coincided;
the bending portion is formed in the bus bar;
a tip direction of the connecting section is parallel to a lining direction of the main circuit section and the capacitor;
the main circuit section includes a plurality of the semiconductor modules;
the bus bar includes a positive bus bar and a negative bus bar;
the bus bar includes a bus bar terminal configuring the connecting section, a main circuit connecting portion connected to the main electrode terminals of the plurality of semiconductor modules, and a connecting portion connecting between the main circuit connecting portion and the bus bar terminal;
the main circuit connecting portion of the positive bus bar and the main circuit connecting portion of the negative bus bar are arranged so as to be opposite to each other;
the bus bar terminal is folded back from the connecting portion toward the main circuit section via the bending portion; and
the connecting portion of the positive bus bar and the connecting portion of the negative bus bar are arranged between the capacitor and the main circuit section in a lining direction of the capacitor and the main circuit section, while being arranged so as to be opposed to each other in the lining direction.

2. The power conversion device according to claim 1, wherein
the bus bar is partially sealed by a resin mold portion, and the bending portion is exposed from the resin mold portion.

3. The power conversion device according to claim 1, wherein
the capacitor body has a capacitor case having an open surface on one side and accommodating therein the capacitor element and a sealing resin that seals the capacitor element,
the capacitor terminal is projected from the open surface, and
the capacitor is arranged such that the open surface of the capacitor case is directed toward the main circuit section.

4. The power conversion device according to claim 2, wherein
the capacitor body has a capacitor case having an open surface on one side and accommodating therein the capacitor element and a sealing resin that seals the capacitor element,
the capacitor terminal is projected from the open surface, and
the capacitor is arranged such that the open surface of the capacitor case is directed toward the main circuit section.

5. The power conversion device according to claim 1, wherein
the main circuit section includes a stacked body in which the semiconductor modules and a plurality of cooling members cooling each of the semiconductor modules from both main surfaces thereof are alternately stacked and arranged, and
the capacitor is arranged on one end side of the stacked body in a stacking direction, relative to the main circuit section.

6. The power conversion device according to claim 2, wherein
the main circuit section includes a stacked body in which the semiconductor modules and a plurality of cooling members cooling each of the semiconductor modules from both main surfaces thereof are alternately stacked and arranged, and
the capacitor is arranged on one end side of the stacked body in a stacking direction, relative to the main circuit section.

7. The power conversion device according to claim 3, wherein
the main circuit section includes a stacked body in which the semiconductor modules and a plurality of cooling members cooling each of the semiconductor modules from both main surfaces thereof are alternately stacked and arranged, and
the capacitor is arranged on one end side of the stacked body in a stacking direction, relative to the main circuit section.

8. The power conversion device according to claim 4, wherein
the main circuit section includes a stacked body in which the semiconductor modules and a plurality of cooling members cooling each of the semiconductor modules from both main surfaces thereof are alternately stacked and arranged, and
the capacitor is arranged on one end side of the stacked body in a stacking direction, relative to the main circuit section.

9. The power conversion device according to claim 1, wherein
the positive bus bar and the negative bus bar are integrated by the resin mold portion that partially seals these bus bars.

10. The power conversion device according to claim 2, wherein
the positive bus bar and the negative bus bar are integrated by the resin mold portion that partially seals these bus bars.

11. The power conversion device according to claim 3, wherein
the positive bus bar and the negative bus bar are integrated by the resin mold portion that partially seals these bus bars.

12. The power conversion device according to claim 4, wherein
the positive bus bar and the negative bus bar are integrated by the resin mold portion that partially seals these bus bars.

13. The power conversion device according to claim 5, wherein
the positive bus bar and the negative bus bar are integrated by the resin mold portion that partially seals these bus bars.

14. The power conversion device according to claim 6, wherein
the positive bus bar and the negative bus bar are integrated by the resin mold portion that partially seals these bus bars.

15. The power conversion device according to claim 7, wherein
the positive bus bar and the negative bus bar are integrated by the resin mold portion that partially seals these bus bars.

16. The power conversion device according to claim 8, wherein
the positive bus bar and the negative bus bar are integrated by the resin mold portion that partially seals these bus bars.

* * * * *